US007964525B2

(12) United States Patent
Dykstra et al.

(10) Patent No.: US 7,964,525 B2
(45) Date of Patent: *Jun. 21, 2011

(54) HYDROCONVERSION MULTI-METALLIC CATALYST AND METHOD FOR MAKING THEREOF

(75) Inventors: Dennis Dykstra, Pinole, CA (US); Theodorus Maesen, Richmond, CA (US); Alexander E. Kuperman, Orinda, CA (US); Soy Uckung, Richmond, CA (US); Darren Fong, Oakland, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 12/432,721

(22) Filed: Apr. 29, 2009

(65) Prior Publication Data
US 2010/0279855 A1 Nov. 4, 2010

(51) Int. Cl.
*B01J 27/04* (2006.01)
*B01J 27/045* (2006.01)
*B01J 27/047* (2006.01)
*B01J 27/051* (2006.01)
*B01J 27/049* (2006.01)
*B01J 31/00* (2006.01)

(52) U.S. Cl. ........ 502/220; 502/216; 502/219; 502/221; 502/152; 502/168; 502/170; 502/208; 502/209; 502/211; 502/213; 502/233

(58) Field of Classification Search .................. 502/216, 502/219, 220, 221, 152, 168, 170, 208, 209, 502/210, 211, 213, 223
See application file for complete search history.

(56) References Cited

U.S. PATENT DOCUMENTS

| 3,640,817 A * | 2/1972 | O'Hara ........................... 208/59 |
| 3,673,079 A | 6/1972 | Mulaskey et al. |
| 3,709,814 A | 1/1973 | Jaffe |
| 3,795,632 A | 3/1974 | Morgan et al. |
| 4,003,851 A | 1/1977 | Ebel et al. |
| 4,009,096 A | 2/1977 | Pollitzer et al. |
| 4,226,742 A | 10/1980 | Bearden et al. |
| 4,328,127 A * | 5/1982 | Angevine et al. ............. 502/219 |
| 4,422,960 A * | 12/1983 | Shiroto et al. ................ 502/206 |
| 4,430,442 A | 2/1984 | Sawyer et al. |
| 4,508,847 A | 4/1985 | Chianelli et al. |
| 4,540,481 A | 9/1985 | Sawyer et al. |
| 4,542,121 A | 9/1985 | Mitchell et al. |
| 4,579,728 A | 4/1986 | Schoenthal et al. |
| 4,595,672 A | 6/1986 | Ho et al. |
| 4,637,870 A | 1/1987 | Bearden et al. |
| 4,666,878 A | 5/1987 | Jacobson et al. |
| 4,719,002 A | 1/1988 | Mayer et al. |
| 4,721,558 A | 1/1988 | Jacobson et al. |
| 4,740,295 A | 4/1988 | Bearden et al. |
| 4,765,882 A | 8/1988 | Aldridge et al. |
| 4,820,677 A | 4/1989 | Jacobson et al. |
| 4,826,797 A | 5/1989 | Chianelli et al. |
| 4,831,002 A | 5/1989 | Ho et al. |
| 4,836,912 A | 6/1989 | Schlosberg et al. |
| 4,976,848 A | 12/1990 | Johnson |
| 5,026,473 A | 6/1991 | Halbert et al. |
| 5,037,532 A | 8/1991 | Winter et al. |
| 5,039,392 A | 8/1991 | Bearden et al. |
| 5,053,376 A | 10/1991 | Bearden et al. |
| 5,122,258 A | 6/1992 | Eadie et al. |
| 5,162,281 A | 11/1992 | Kamo et al. |
| 5,252,199 A | 10/1993 | Singhal et al. |
| 5,278,121 A | 1/1994 | Singhal et al. |
| 5,300,212 A | 4/1994 | Winter et al. |
| 5,384,336 A | 1/1995 | Koros |
| 5,397,456 A | 3/1995 | Dai et al. |
| 5,648,577 A | 7/1997 | Ho et al. |
| 5,695,632 A | 12/1997 | Brons et al. |
| 5,728,644 A | 3/1998 | Ho et al. |
| 5,767,037 A | 6/1998 | Ho et al. |
| 5,831,138 A | 11/1998 | Ho et al. |
| 5,900,384 A | 5/1999 | Soltani-Ahmadi et al. |
| 5,935,418 A | 8/1999 | Chakrabarty et al. |
| 5,935,421 A | 8/1999 | Brons et al. |
| 5,935,897 A | 8/1999 | Trubenbach et al. |

(Continued)

FOREIGN PATENT DOCUMENTS
EP 526988 6/1992
(Continued)

OTHER PUBLICATIONS

Catalysis Today 41 (1998) pp. 207-219 "Surface Area and Pore Structure of Catalysts" by Leofanti et al.
Energy & Fuels 2009, 23, pp. 1683-1694 "Atmospheric Residues of Kuwait Heavy Crude Upgrading: A Pilot Plant and Model Simulation Study" by Bahzad et al.
Chemical Engineering Science 62 (2007) pp. 463-470 "Drying of wet agglomerates in a continuous fluid bed: Influence of Residence time, air temperature and air flow rate on the drying kinetics and Molecular Weight Distribution in Heavy Crudes" 1998 Paper authored by Boduszynski et al.
Energy & fuels pp. 1065-1071 "Estimation of Total Aromatic Content of Vacuum Gas Oil (VGO) Fractions (370-560 ° C) by 1H NMR Spectroscopy" by Kapur et al., 2005.
Material Safety Data Sheet—Malic Acid. Date.

(Continued)

*Primary Examiner* — Elizabeth D Wood

(57) ABSTRACT

A stable catalyst with low volumetric shrinkage and a process for making the stable catalyst with low volumetric shrinkage is disclosed. The catalyst is made by sulfiding a catalyst precursor containing at least a Group VIB metal compound; at least a promoter metal compound selected from Group VIII, Group IIB, Group IIA, Group IVA and combinations thereof, having an oxidation state of either +2 or +4; optionally at least a ligating agent; optionally at least a diluent. In the process of making the catalyst, the catalyst precursor is first shaped then heat treated at a temperature of 50° C. to 200° C. for about 15 minutes to 12 hours, wherein the catalyst precursor still has a low (less than 12%) volumetric shrinkage after exposure to a temperature of at least 100° C. for at least 30 minutes, e.g., in sulfidation or in a hydrotreating reactor.

13 Claims, 1 Drawing Sheet

U.S. PATENT DOCUMENTS

| | | | |
|---|---|---|---|
| 5,977,192 | A | 11/1999 | Howsmon et al. |
| 6,030,915 | A | 2/2000 | Boer |
| 6,136,180 | A | 10/2000 | Benazzi et al. |
| 6,156,695 | A | 12/2000 | Soled et al. |
| 6,162,350 | A | 12/2000 | Soled et al. |
| 6,171,471 | B1 | 1/2001 | Ferrughelli et al. |
| 6,299,760 | B1 | 10/2001 | Soled et al. |
| 6,461,995 | B1 | 10/2002 | Addiego et al. |
| 6,531,516 | B2 | 3/2003 | Davis et al. |
| 6,534,437 | B2 | 3/2003 | Eijsbouts et al. |
| 6,566,296 | B2 | 5/2003 | Plantenga et al. |
| 6,620,313 | B1 | 9/2003 | Demmin et al. |
| 6,635,599 | B1 | 10/2003 | Eijsbouts et al. |
| 6,652,738 | B2 | 11/2003 | Eijsbouts et al. |
| 6,712,955 | B1 | 3/2004 | Hou et al. |
| 6,758,963 | B1 | 7/2004 | Hantzer et al. |
| 6,783,663 | B1 | 8/2004 | Riley et al. |
| 6,919,066 | B2 | 7/2005 | Holzle |
| 7,183,005 | B2 | 2/2007 | Poloso et al. |
| 7,229,548 | B2 | 6/2007 | Riley et al. |
| 7,232,515 | B1 | 6/2007 | Demmin et al. |
| 7,288,182 | B1 * | 10/2007 | Soled et al. ............ 208/112 |
| 7,387,983 | B2 | 6/2008 | Holzle |
| 7,507,770 | B2 | 3/2009 | Dogterom et al. |
| 2002/0010088 | A1 | 1/2002 | Eijsbouts et al. |
| 2002/0045539 | A1 * | 4/2002 | Kasztelan ............ 502/222 |
| 2003/0102254 | A1 | 6/2003 | Eijsbouts et al. |
| 2003/0150778 | A1 | 8/2003 | Haluska et al. |
| 2004/0182749 | A1 * | 9/2004 | Domokos et al. ............ 208/213 |
| 2004/0235653 | A1 | 11/2004 | Domokos et al. |
| 2005/0040080 | A1 | 2/2005 | Riley et al. |
| 2005/0250863 | A1 | 11/2005 | Green et al. |
| 2006/0060500 | A1 * | 3/2006 | Guillaume et al. ............ 208/108 |
| 2006/0060502 | A1 | 3/2006 | Soled et al. |
| 2006/0060503 | A1 | 3/2006 | Soled et al. |
| 2006/0070915 | A1 | 4/2006 | Euzen et al. |
| 2006/0157386 | A1 | 7/2006 | Al-Naeem et al. |
| 2006/0207917 | A1 | 9/2006 | Domokos et al. |
| 2007/0084754 | A1 | 4/2007 | Soled et al. |
| 2007/0090023 | A1 | 4/2007 | Soled et al. |
| 2007/0090024 | A1 | 4/2007 | Soled et al. |
| 2008/0060977 | A1 | 3/2008 | Bhan |
| 2008/0132407 | A1 | 6/2008 | Bai et al. |
| 2008/0275286 | A1 | 11/2008 | Xiao et al. |
| 2008/0306172 | A1 | 12/2008 | Reynhout et al. |
| 2008/0308462 | A1 | 12/2008 | Eijsbouts-Spickova et al. |
| 2009/0014356 | A1 | 1/2009 | Eijsbouts-Spickova et al. |
| 2009/0057201 | A1 | 3/2009 | Brait et al. |

FOREIGN PATENT DOCUMENTS

| | | | |
|---|---|---|---|
| EP | 1169414 | | 10/2008 |
| EP | 2103347 | | 9/2009 |
| WO | WO 02/04117 | * | 1/2002 |
| WO | 2007070394 | | 6/2007 |

OTHER PUBLICATIONS

Co-pending U.S. Appl. No. 12/259,412, filed Oct. 28, 2008 (Publication US 2009-0112010).
Co-pending U.S. Appl. No. 12/259,424, filed Oct. 28, 2008 (Publication US 2009-0111682).
Co-pending U.S. Appl. No. 12/259,435, filed Oct. 28, 2008 (Publication US 2009-0107889).
Co-pending U.S. Appl. No. 12/259,442, filed Oct. 28, 2008 (Publication US 2009-0111685).
Co-pending U.S. Appl. No. 12/259,451, filed Oct. 28, 2008 (Publication US 2009-0107883).
Co-pending U.S. Appl. No. 12/259,467, filed Oct. 28, 2008 (Publication US 2009-0111683).
Co-pending U.S. Appl. No. 12/259,495, filed Oct. 28, 2008 (Publication US 2009-0107886).
Co-pending U.S. Appl. No. 12/259,507, filed Oct. 28, 2008 (Publication US 2009-0111686).
Co-pending U.S. Appl. No. 12/259,529, filed Oct. 28, 2008 (Publication US 2009-0112011).
Co-pending U.S. Appl. No. 12/432,719, filed Apr. 29, 2009.
Co-pending U.S. Appl. No. 12/432,723, filed Apr. 29, 2009.
Co-pending U.S. Appl. No. 12/432,727, filed Apr. 29, 2009.
Co-pending U.S. Appl. No. 12/432,728, filed Apr. 29, 2009.
Co-pending U.S. Appl. No. 12/432,730, filed Apr. 29, 2009.
Co-pending U.S. Appl. No. 12/770,388, filed Apr. 29, 2010.
PCT Search Report and Written Opinion for PCT/US08/81463 mailed Jan. 14, 2009.
Adsorption-Desorption Isotherm Studies of Catalysts, Ries et al., The Sixclair Kefinlngc Company, Aug. 1945.
Hydrodesulfurizafion Activity MoS2 and Bimetallic: Catalysts Prepared by in Situ Decomposition of Thiosalt, Trakarnpruk et at, *Ind. Eng. Chem. Res.* 2007, 46, 1874-1882.
MgO-supported Mo, CoMo and NiMo sulfide hydrotreating catalysts, Zdražil, Catalysis Today 86 (2003) 151-171.
Cobalt-molybdenum sulfide catalysts prepared by in situ activation of bimetallic (Co-Mo) alkylthiomolybdates, Nava et al., Catalysis Letters vol. 86, No. 4, Mar. 2003.
Structured zeolites catalysts with hierarchical channel structure, Gu et al., www.rsc.org/chemcomm. Feb. 2010.
Pore structure of bulk tungsten carbide power catalysts, Lofberg et al., Catalysis Letters 33 (1995) 165-173.
Preparation of Cr2O3-promoted copper catalysts on rice husk ash by incipient wetness impregnation, Chang et al., Applied Catalysis A: General 288 (2005) 53-61.
Determination of effectiveness factor of a partial internal wetting catalyst from adsorption measurement, zhou et a1., Chemical Engineering Science 59 (2004) 4305-4311.
Chemisorption of Hydrogen Sulfide on Nickel and Ruthium Catalysts, Oliphant et 0.1., Journal of Catalysis 51, 229-242 (1978).
Lower Closure Point of Adsorption Hysteresis in Ordered Mesoporous Silicas, Morishige et al., *Langmuir* 2007, 23, 11021-11026.
Physisorption hysteresis loops and the characterization of nanoporous materials, Sing et al., Adsorption Science & Technology (2004), 22(10), 773-782.
PCT Search Report and Written Opinion related to PCT/US2010/030331 dated Dec. 28, 2010.

* cited by examiner

HYDROCONVERSION MULTI-METALLIC CATALYST AND METHOD FOR MAKING THEREOF

CROSS-REFERENCE TO RELATED APPLICATIONS

NONE.

TECHNICAL FIELD

The invention relates generally to a hydroprocessing catalyst precursor, processes for preparing the catalyst precursor, multi-metallic catalysts prepared using the catalyst precursor, and hydroconversion processes employing the multi-metallic catalysts.

BACKGROUND

The petroleum industry is increasingly turning to heavy crudes, resids, coals and tar sands, i.e., lower grade hydrocarbon ("heavy oil"), as sources for feedstocks. The upgrading or refining of these feedstocks is accomplished by treating the feedstocks with hydrogen in the presence of catalysts to effect conversion of at least a portion of the feeds to lower molecular weight hydrocarbons, or to effect the removal of unwanted components, or compounds, or their conversion to innocuous or less undesirable compounds.

In the hydroconversion process, catalysts that are unstabilized, or of limited mechanical integrity, undergo considerable shrinkage of their geometric volume when exposed to severe conditions. When the catalysts are used to fill a reactor space as in a fixed bed, the catalyst shrinkage produces unoccupied channels through which reactants can pass without being in contact with the catalyst. Channeling of reactants decreases effectiveness of the catalyst bed regardless of the activity of the catalyst in the reactor space. Catalyst shrinkage further decreases effectiveness of the bed utilization as less reactor volume is used. Lastly, the pressure drop across the reactor due to the catalyst's volumetric shrinkage can have a significant impact on the reactor performance.

There is still the need for a bulk/unsupported catalyst for use in the hydroconversion of lower grade hydrocarbon with improved performance, i.e., providing high yield conversions as well as exhibiting low shrinkage when exposed to high reaction temperatures.

SUMMARY OF THE INVENTION

In one aspect, the invention relates to a stable bulk multi-metallic catalyst with low volume shrinkage for use in the hydroconversion of hydrocarbon feedstock, the catalyst is formed from a catalyst precursor having a residual geometric volume shrinkage of less than 10% upon exposure to a temperature of at least 100° C. for at least 30 minutes, the precursor comprising: at least a Group VIB metal compound; at least a promoter metal compound selected from Group VIII, Group IIB, Group IIA, Group IVA and combinations thereof, optionally at least a ligating agent; optionally at least a diluent; wherein the catalyst precursor.

In yet another aspect, the invention relates to a method for forming a catalyst from a catalyst precursor having a low volumetric shrinkage, the method comprising: forming a precipitate comprising at least a promoter metal precursor, at least a Group VIB metal precursor, optionally at least a ligating agent, and optionally at least a diluent, wherein the promoter metal precursor is selected from Group VIII, Group IIB, Group IIA, Group IVA and combinations thereof, removing at least 50% of liquid from the precipitate forming a filter cake; adding to the filter cake at least one of a shaping aid agent, a pore forming agent, a peptizing agent, a diluent, and combinations thereof, forming a batch mixture; shaping the batch mixture into a shaped catalyst precursor via any of pelletizing, extrusion, tableting, molding, tumbling, pressing, spraying and spray drying; drying the shaped catalyst precursor at a temperature ranging from 50° C. to 200° C. for about 15 minutes to 12 hours; and sulfiding the shaped catalyst precursor forming the bulk multi-metallic catalyst. The shaped catalyst precursor is measured for volumetric shrinkage before and after sulfiding, showing a volumetric shrinkage of less than 10%.

DETAILED DESCRIPTION

Figure 1:
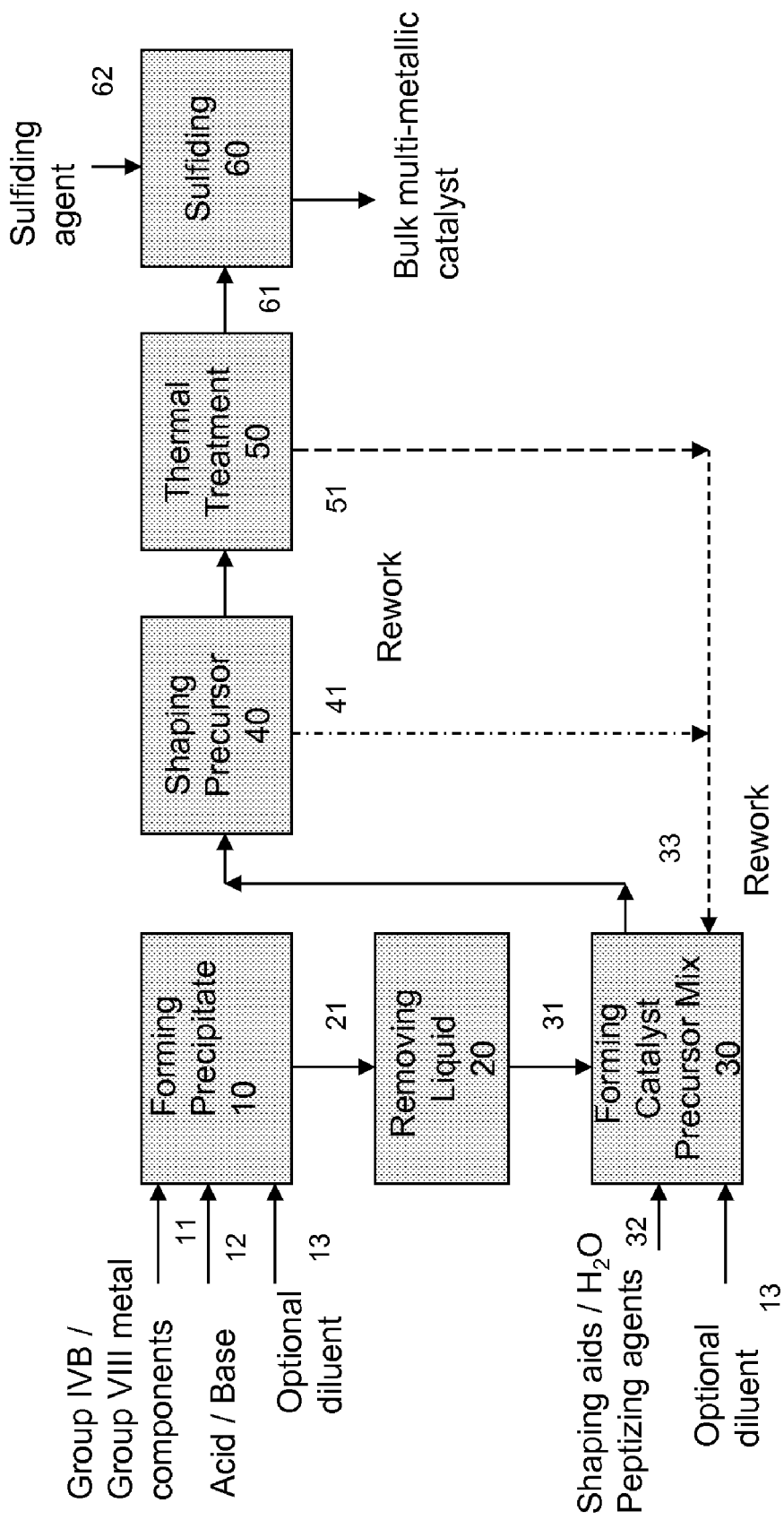
FIG. 1 is block diagram showing an embodiment of a process for making a multi-metallic catalyst incorporating rework materials.

The following terms will be used throughout the specification and will have the following meanings unless otherwise indicated.

SCF/BBL (or scf/bbl, or scfb or SCFB) refers to a unit of standard cubic foot of gas ($N_2$, $H_2$, etc.) per barrel of hydrocarbon feed.

LHSV means liquid hourly space velocity.

The Periodic Table referred to herein is the Table approved by IUPAC and the U.S. National Bureau of Standards, an example is the Periodic Table of the Elements by Los Alamos National Laboratory's Chemistry Division of October 2001.

As used here, the term "bulk catalyst" may be used interchangeably with "unsupported catalyst," meaning that the catalyst composition is NOT of the conventional catalyst form which has a preformed, shaped catalyst support which is then loaded with metals via impregnation or deposition catalyst. In one embodiment, the bulk catalyst is formed through precipitation. In another embodiment, the bulk catalyst has a binder incorporated into the catalyst composition. In yet another embodiment, the bulk catalyst is formed from metal compounds and without any binder.

As used herein, the phrases "one or more of" or "at least one of" when used to preface several elements or classes of elements such as X, Y and Z or $X_1$-$X_n$, $Y_1$-$Y_n$ and $Z_1$-$Z_n$, is intended to refer to a single element selected from X or Y or Z, a combination of elements selected from the same common class (such as $X_1$ and $X_2$), as well as a combination of elements selected from different classes (such as $X_1$, $Y_2$ and Zn).

As used herein, "hydroconversion" or "hydroprocessing" is meant any process that is carried out in the presence of hydrogen, including, but not limited to, methanation, water gas shift reactions, hydrogenation, hydrotreating, hydrodesulphurization, hydrodenitrogenation, hydrodemetallation, hydrodearomatization, hydroisomerization, hydrodewaxing and hydrocracking including selective hydrocracking. Depending on the type of hydroprocessing and the reaction conditions, the products of hydroprocessing can show improved viscosities, viscosity indices, saturates content, low temperature properties, volatilities and depolarization, etc.

As used herein, 700° F.+conversion rate refers to the conversion of an oil feedstock to less than 700° F. (371.° C.) boiling point materials in a hydroconversion process, computed as (100%*(wt. % boiling above 700° F. materials in feed−wt. % boiling above 700° F. materials in products)/wt. % boiling above 700° F. materials in feed)).

As used herein, "LD50" is the amount of a material, given all at once, causes the death of 50% (one half) of a group of test animals. LD-50 measures the short-term poisoning potential (acute toxicity) of a material with the testing being done with smaller animals such as rats and mice (in mg/Kg).

As used herein, "shaped catalyst precursor" means catalyst precursor formed (or shaped) by spray drying, pelleting, pilling, granulating, beading, tablet pressing, bricketting, using compression method via extrusion or other means known in the art or by the agglomeration of wet mixtures. The shaped catalyst precursor can be in any form or shape, including but not limited to pellets, cylinders, straight or rifled (twisted) trilobes, multiholed cylinders, tablets, rings, cubes, honeycombs, stars, tri-lobes, quadra-lobes, pills, granules, etc.

Catalyst Product: The hydroconversion bulk catalyst having low volume shrinkage herein is formed from a catalyst precursor. The precursor is converted into a catalyst (becoming catalytically active) upon sulfidation, e.g., for subsequent use in hydrodesulfurization (HDS), hydrodearomatization (HDA), and hydrodenitrification (HDN) processes. The starting material, i.e., catalyst precursor, can be a hydroxide or oxide material, prepared from at least a Promoter metal and a Group VIB metal precursors. The metal precursors can be in either elemental or compound form.

In one embodiment, the catalyst is prepared from a catalyst precursor in the form of a bulk multi-metallic oxide comprising of at least one Group VIII non-noble material and at least two Group VIB metals. In one embodiment, the ratio of Group VIB metal to Group VIII non-noble metal ranges from about 10:1 to about 1:10. In another embodiment, the oxide catalyst precursor is of the general formula: $(X)_b(Mo)_c(W)_d O_z$; wherein X is Ni or Co, the molar ratio of b:(c+d) is 0.5/1 to 3/1, the molar ratio of c:d is >0.01/1, and z=[2b+6 (c+d)]/2. In yet another embodiment, the oxide catalyst precursor further comprises one or more ligating agents L. The term "ligand" may be used interchangeably with "ligating agent," "chelating agent" or "complexing agent" (or chelator, or chelant), referring to an additive that combines with metal ions, e.g., Group VIB and/or Promoter metals, forming a larger complex, e.g., a catalyst precursor.

In another embodiment, the catalyst is prepared from a catalyst precursor in the form of a hydroxide comprising of at least one Group VIII non-noble material and at least two Group VIB metals. In one embodiment, the hydroxide compound is of the general formula $A_v[(M^P)(OH)_x(L)^n y]_z (M^{VIB}O_4)$, wherein A is one or more monovalent cationic species, M refers to at least a metal in their elemental or compound form, and L refers to one or more ligating agent.

In yet another embodiment, the catalyst is prepared from a catalyst precursor with the inclusion of at least a diluent, the precursor is of the formula $A_r [(M^{IIA})_s(M^{VIII})_t(Al)_u(OH)_v (L)_w]_x(Si_{(1-y)}Al_yO_2)_z(M^{VIB}O_4)$, wherein A is one or more monovalent cationic species, $M^{IIA}$ is one or more group IIA metals, $M^{VIII}$ is one or more Group VIII metals, Al is aluminum, L is one or more ligating agents, $(Si_{(1-y)}Al_yO_2)$ is a silica-alumina moiety, $M^{VIB}$ is one or more Group VIB metals with the atomic ratio of $M^{VIII}:M^{VIB}$ between 100:1 and 1:100.

In one embodiment, A is at least one of an alkali metal cation, an ammonium, an organic ammonium and a phosphonium cation. In one embodiment, A is selected from monovalent cations such as NH4+, other quaternary ammonium ions, organic phosphonium cations, alkali metal cations, and combinations thereof.

In one embodiment, L is one or more ligating agents. In another embodiment, L is charge neutral or has a negative charge n<=0. In another embodiment, L is a non-toxic organic oxygen containing ligating agent with an LD50 rate (as single oral dose to rats) of greater than 500 mg/Kg. The term "charge-neutral" refers to the fact that the catalyst precursor carries no net positive or negative charge. In one embodiment, ligating agents include both polydentate as well as monodentate, e.g., $NH_3$ as well as alkyl and aryl amines. Other examples of ligating agents L include but are not limited to carboxylates, carboxylic acids, aldehydes, ketones, the enolate forms of aldehydes, the enolate forms of ketones, and hemiacetals, and combinations thereof. The term "carboxylate" refers to any compound containing a carboxylate or carboxylic acid group in the deprotonated or protonated state. In another embodiment, L is selected from the group of organic acid addition salts such as formic acid, acetic acid, propionic acid, maleic acid, malic acid, cluconic acid, fumaric acid, succinic acid, tartaric acid, citric acid, oxalic acid, glyoxylic acid, aspartic acid, alkane sulfonic acids such as methane sulfonic acid and ethane sulfonic acid, aryl sulfonic acids such as benzene sulfonic acid and p-toluene sulfonic acid and arylcarboxylic acids; carboxylate containing compounds such as maleate, formate, acetate, propionate, butyrate, pentanoate, hexanoate, dicarboxylate, and combinations thereof.

$M^P$ is at least a promoter metal. In one embodiment, $M^P$ has an oxidation state of either +2 or +4 depending on the Promoter metal(s) being employed. $M^P$ is selected from Group VIII, Group IIB, Group IIA, Group IVA and combinations thereof. In one embodiment, $M^P$ is at least a Group VIII metal and $M^P$ has an oxidation state P of +2. In another embodiment, $M^P$ is selected from Group IIB, Group IVA and combinations thereof. In one embodiment, the Promoter metal $M^P$ is at least a Group VIII metal with $M^P$ having an oxidation state of +2 and the catalyst precursor is of the formula $A_v[(M^P)(OH)_x(L)^n{}_{y}]_z (M^{VIB}O_4)$ to have (v−2+2 z−x*z+ n*y*z)=0. In one embodiment, the Promoter metal $M^P$ is a mixture of two Group VIII metals such as Ni and Co. In yet another embodiment, $M^P$ is a combination of three metals such as Ni, Co and Fe. In one embodiment where $M^P$ is a mixture of two group IIB metals such as Zn and Cd, the catalyst precursor is of the formula $A_v[(Zn_aCd_{a'})(OH)_x (L)_y]_z (M^{VIB}O_4)$. In yet another embodiment, $M^P$ is a combination of three metals such as Zn, Cd and Hg, and the catalyst precursor is of the formula $A_v[(Zn_aCd_aHg_{a''}) (OH)_x(L)_{ny}]_z (M^{VIB}O_4)$.

In one embodiment, the Promoter metal $M^P$ is selected from the group of IIB and VIA metals such as zinc, cadmium, mercury, germanium, tin or lead, and combinations thereof, in their elemental, compound, or ionic form. In yet another embodiment, the Promoter metal $M^P$ further comprises at least one of Ni, Co, Fe and combinations thereof, in their elemental, compound, or ionic form. In another embodiment, the Promoter metal is a Group IIA metal compound, selected from the group of magnesium, calcium, strontium and barium compounds which are at least partly in the solid state, e.g., a water-insoluble compound such as a carbonate, hydroxide, fumarate, phosphate, phosphite, sulphide, molybdate, tungstate, oxide, or mixtures thereof.

In one embodiment, $M^{VIB}$ is at least a Group VIB metal having an oxidation state of +6. In one embodiment, $M^{P:MVIB}$ has an atomic ratio between 100:1 and 1:100. v−2+P*z−x*z+ n*y*z=0; and $0 \leq y \leq -P/n$; $0 \leq x \leq P$; $0 \leq v \leq 2$; $0 \leq z$. In one embodiment, $M^{VIB}$ is molybdenum.

In yet another embodiment, $M^{VIB}$ is a mixture of at least two Group VIB metals, e.g., molybdenum and tungsten.

Methods for Making Catalyst with Low Shrinkage: The catalyst prepared herein has a low volume shrinkage in hydroprocessing operations, in combination with high mechanical strength and improved performance, i.e., providing high yield conversions. The low shrinkage results from the controlled/optimization of the thermal treatment of the catalyst precursor.

Reference will be made to FIG. 1, which is a block diagram schematically illustrating an embodiment of a general process for making a multi-metallic catalyst having a low shrinkage.

Forming a Precipitate or Cogel: The first step 10 in the process is a precipitation or cogellation step, which involves reacting in a mixture of the metal precursors 11, e.g., Promoter metal component(s) and the Group VIB metal component to obtain a precipitate or cogel. The term "cogel" refers to a co-precipitate (or precipitate) of at least two metal compounds. The metal precursors can be added to the reaction mixture as a solid, in solution, suspension, or a combination thereof. If soluble salts are added as such, they will dissolve in the reaction mixture and subsequently be precipitated or cogelled, or forming a suspension. The solution can be heated optionally under vacuum to effect precipitation and evaporation of the liquid.

The precipitation (or cogelation) is carried out at a temperature and pH under which the Promoter metal compound and the Group VIB metal compound precipitate or form a cogel. In one embodiment, the temperature at which the cogel is formed is between 25-350° C. In one embodiment, the catalyst precursor is formed at a pressure between 0 to 3000 psig. In a second embodiment, between 10 to 1000 psig. In a third embodiment, between 30 to 100 psig. The pH of the mixture can be changed to increase or decrease the rate of precipitation or cogelation depending on the desired characteristics of the product. In one embodiment, the mixture is left at its natural pH during the reaction step(s). In another embodiment the pH is maintained in the range of 0-12. In another embodiment, the pH is maintained in the range of 7-10. Changing the pH can be done by adding base or acid 12 to the reaction mixture, or adding compounds, which decompose upon temperature increase into hydroxide ions or $H^+$ ions that respectively increase or decrease the pH. In another embodiment, adding compounds which participate in the hydrolysis reaction. Examples of compounds to be added for pH adjustment include but are not limited to urea, nitrites, ammonium hydroxide, mineral acids, organic acids, mineral bases, and organic bases.

In one embodiment, at least a ligating agent L can be optionally added prior to or after precipitation or cogellation of the promoter metal compounds and/or Group VIB metal compounds, i.e., the ligating agent L can be added to the metal precursors as one of the reagents forming the precipitate, or it can be added after the precipitate is formed.

In one embodiment, instead of or in addition to the ligating agent L, diluent amounts from 5-95 wt. % of the total composition of the catalyst precursor can also be added to this step, depending on the envisaged catalytic application. These materials can be applied before or after the precipitation or cogelation of the metal precursors. Examples of diluent materials include zinc oxide; zinc sulfide; niobia; tetraethyl orthosilicate; silicic acid; titania; silicon components such as sodium silicate, potassium silicate, silica gels, silica sols, silica gels, hydronium- or ammonium-stabilized silica sols, and combinations thereof, aluminum components useful in the process of the present invention include, but are not limited to, sodium aluminate, potassium aluminate, aluminum sulfate, aluminum nitrate, and combinations thereof, magnesium components such as magnesium aluminosilicate clay, magnesium metal, magnesium hydroxide, magnesium halides, magnesium sulfate, and magnesium nitrate; zirconia; cationic clays or anionic clays such as saponite, bentonite, kaoline, sepiolite or hydrotalcite, or mixtures thereof. In one embodiment, titania is used as a diluent in an amount of greater than 50 wt. %, on a final catalyst precursor basis (as an oxide or hydroxide).

Liquid Removal: In the next step 20, at least 50 wt. % of liquid (supernatant/water) is removed from the precipitate (or suspension) via separation processes known in the art, e.g., filtering, decanting, centrifuging, etc. In one embodiment, liquid in the precipitate is removed via filtration with vacuum techniques or equipment known in the art, giving a wet filter cake. A wet filter cake is generally defined as filter cake having approximately 10 to 50 wt. % liquid, thus being generally free of water or other solvent such as methanol and the like.

In one embodiment, optional drying of the filter cake is performed under atmospheric conditions or under an inert atmosphere such as nitrogen, argon, or vacuum, and at a temperature sufficient to remove water but not removal of organic compounds. In one embodiment, optional drying is performed at about 50 to 120° C. until a constant weight of the catalyst precursor is reached. In another embodiment, the drying is done at a temperature between 50° C. to 200° C. for a period ranging from ½ hour to 6 hours. Drying can be done via thermal drying techniques known in the art, e.g., flash drying, belt drying, oven drying, etc.

Forming Catalyst Precursor Mix For Shaping: In this step 30, the filter cake is mixed together with water and other optional materials including but not limited to shaping aids, peptizing agents, pore forming agents, and diluent materials. In one embodiment, rework material in the form of filter cake material, extrudable dough and/or dry particles/pieces of precursor materials from previous runs can be optionally included the materials to form a new batch of catalyst precursor mix.

The precursor batch mixture is mixed for a sufficient period of time to obtain a mixture that is substantially uniform or homogeneous. The mixing time depends on the type and efficiency of the mixing technique, e.g., milling, kneading, slurry mixing, dry or wet mixing, or combinations thereof and the mixing apparatus used, e.g., a pug mill, a blender, a double-arm kneading mixer, a rotor stator mixer, or a mix muller. In one embodiment, the mixing time ranges from 0.1 to 10 hours.

In one embodiment, a shaping aid agent is added in a ratio of between 100:1 and 10:1 (wt. % catalyst precursor to wt. % shaping aid). In one embodiment, the shaping aid agent is selected an organic binder of the cellulose ether type and/or derivatives. Examples include methylcellulose, hydroxybutylcellulose, hydrobutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. In another embodiment, the shaping aid is a polyakylene glycol such as polyethylene glycol (PEG). In yet another embodiment, shaping aids are selected from saturated or unsaturated fatty acid (such as politic acid, satiric acid or oleic acid) or a salt thereof, a polysaccharide derived acid or a salt thereof, graphite, starch, alkali stearate, ammonium stearate, stearic acid, mineral oils, and combinations thereof.

In one embodiment, a peptizing agent may be added to the mixture. The peptizing agent may be an alkali or an acid, e.g., ammonia, formic acid, citric acid, nitric acid, maleic acid, etc. In one embodiment whether the catalyst precursor material is to be spray-dried, ammonia solution from 10 to 28% strength can be added in amounts of from 50 to 150 ml per 100 g of spray-dried material. In another embodiment, acids can be employed in the form of aqueous solutions of from 2 to 4% strength, in amounts of from 10 to 20 ml per 100 g of spray-dried material.

In another embodiment, a pore forming agent is also added to the mixture along with the rework. Examples of pore forming agents include but are not limited to mineral oils, steric acid, polyethylene glycol polymers, carbohydrate polymers, methacrylates, cellulose polymers, and carboxylates which decompose upon being heated. Examples of commercially available cellulose based pore forming agents include but are not limited to: Methocel™ (available from Dow Chemical Company), Avicel™ (available from FMC Biopolymer), Morwet™ (from Witco) and Porocel™ (available from Porocel).

In yet another embodiment, diluent materials can be added. The diluent materials added in this step can be the same as or different from any diluent materials that may have been added to the step of forming the precipitate from metal precursors above.

In one embodiment wherein the catalyst precursor is to be shaped via pelletizing, extrusion, or pressing, a sufficient amount of water is added to the mixing batch to adjust the batch viscosity to a convenient level for plasticizing and shaping, i.e., a mixture of dough consistency. In one embodiment, a sufficient amount of water is added for the mixture to have between 50 to 90% solids (LOI). In another embodiment, between 60 to 70% solids (LOI).

Shaping Process: In this step, the catalyst precursor mix is shaped into formed particles, such as spheroids, pills, tablets, cylinders, irregular extrusions, merely loosely bound aggregates or clusters, etc., using any of the methods known in the art including pelletizing, extrusion, tableting, molding, tumbling, pressing, spraying and spray drying.

In one embodiment, a shaped catalyst precursor is formed via extrusion, using extrusion equipment known in the art, e.g., single screw extruder, ram extruder, twin-screw extruder, etc. In another embodiment, the shaping is done via spray drying at an outlet temperature ranging from 100° C. to 320° C. In one embodiment, shaped catalyst precursor is extruded into extrudate having a diameter from about 1/16 to 1/6 of an inch. After extrusion the extrudate can be cut to suitable lengths, e.g., 1/16-inch to 5/16-inch, to produce cylindrical pellets.

Thermal Treatment: In one embodiment, the shaped catalyst precursor is air (or nitrogen) dried in a directly or indirectly heated oven, tray drier, or belt drier at about 50° C. to 325° C. for about 15 minutes to 24 hours, and wherein the temperature is room temperature to drying temperature at a rate of 1-50° C. per minute. In one embodiment, the temperature is ramped up at a slow rate of 1-2° C. per minute. In a second embodiment, air drying is performed at a fast ramp up rate of at least 25° C. per minute. In one embodiment, the drying is at a temperature at or below 100° C.

Generally, it is known that the higher temperature of the heat treatment, the higher the densities of the catalyst precursor and therefore, upon sulfidation, resulting in a catalyst that also has a low shrinkage rate. An analogous example is in ceramic technology. In the present invention, it is unexpected that low (less than 10%) volumetric shrinkage is still obtained with the thermal treatment at a low temperature, e.g., less than 325° C., less than 200° C., and even at a temperature at or below 100° C.

In one embodiment, after the thermal treatment, the shaped catalyst can be optionally calcined at a temperature in the range of about 350° C. to 750° C. in a suitable atmosphere, e.g., inerts such as nitrogen or argon, or steam. In yet another embodiment, the calcination is carried out at a temperature between 350° C. to 600° C. In the calcination process, the catalyst precursor gets converted into an oxide.

In one embodiment, the catalyst precursor is nitrogen stable. As used herein, the term nitrogen stable means that the properties (after the catalyst precursor is sulfided to form a catalyst) are not affected by the drying agent, i.e., whether drying in a nitrogen or oxygen environment.

Sulfiding Step: The shaped catalyst precursor containing rework material 61 can be sulfided to form an active catalyst, with the use of at least a sulfiding agent 62 selected from the group of: elemental sulfur by itself, a sulfur-containing compound which under prevailing conditions, is decomposable into hydrogen sulphide; $H_2S$ by itself or $H_2S$ in any inert or reducing environment, e.g., $H_2$. Examples of sulfiding agents include ammonium sulfide, ammonium polysulfide ($[(NH_4)_2S_x]$), ammonium thiosulfate (($NH_4)_2S_2O_3$), sodium thiosulfate $Na_2S_2O_3$), thiourea $CSN_2H_4$, carbon disulfide, dimethyl disulfide (DMDS), dimethyl sulfide (DMS), dibutyl polysulfide (DBPS), mercaptanes, tertiarybutyl polysulfide (PSTB), tertiarynonyl polysulfide (PSTN), and the like. In one embodiment, hydrocarbon feedstock is used as a sulfur source for performing the sulfidation of the catalyst precursor.

In the sulfiding step, shaped catalyst precursor is converted into an active catalyst upon contact with the sulfiding agent at a temperature ranging from 25° C. to 500° C., from 10 minutes to 15 days, and under a $H_2$-containing gas pressure. The total pressure during the sulfidation step can range between atmospheric to about 10 bar (1 MPa). If the sulfidation temperature is below the boiling point of the sulfiding agent, the process is generally carried out at atmospheric pressure. Above the boiling temperature of the sulfiding agent/optional components (if any), the reaction is generally carried out at an increased pressure.

Use of the Catalyst: As catalyst precursors sometimes can be sulfided in-situ, e.g., in the same hydrotreating reactors during hydrotreatment, a catalyst's stability can be evaluated based on the residual geometric volume shrinkage of the catalyst precursor. This is measured as the change in the geometric volume of the shaped catalyst precursor before and after it is sulfided. In the sulfidation process, the catalyst precursors are exposed to a high temperature of up to 500° C. In this step, shrinkage is expected as the oxide/hydroxide precursor is converted into a sulfided catalyst. The volumetric shrinkage measured after the sulfidation step can be used as an indication of a catalyst's mechanical integrity under severe hydroprocessing conditions, as precursors are often sulfided in-situ in the same reactor as the hydroprocessing reactor.

In one embodiment, the bulk multi-metallic catalyst is prepared by sulfiding a catalyst precursor having a residual geometric volume shrinkage of less than about 12% upon exposure to a temperature of at least 100° C. for at least 30 minutes in a sulfiding step. In a second embodiment, the volume shrinkage is less than about 10%. In a third embodiment, the volume shrinkage is less than about 8%. In a fourth embodiment, less than 5%. In yet another embodiment, the volume shrinkage is less than about 10% upon exposure to a temperature of at least 200° C. for at least 30 minutes. In a fifth embodiment, the volume shrinkage is less than about 10% upon exposure to a temperature of at least 250° C. for at least 30 minutes. Volumetric changes can be measured indirectly via the catalyst precursor's compact bulk density (CBD).

Besides having a low shrinkage rate, the precursor for forming the catalyst also exhibits other desirable properties, including a surface area measured by the BET method, using nitrogen as adsorbate, in the range of about 40 to 300 $m^2/g$; a compact bulk density (CBD) of at most 1.6 g/cc; a pore volume measured using nitrogen adsorption up to 95 nm on the BET adsorption curve of 0.002 to 2.0 cm$^3$/g; a crush strength of at least about 4 lbs; and an attrition loss of less than 7 wt. %. In one embodiment, the pore volume is less than 1.0 cm$^3$/g. In another embodiment, the attrition loss is less than 5 wt. %. In a third embodiment, the CBD is at most 1.4 g/cc. In a fourth embodiment, the CBD is at most 1.2 g/cc. In a fifth embodiment, the crush strength is at least 6 lbs. Attrition loss is the loss to fine amount measured when tumbled one-half hour in a rotating drum.

The bulk multi-metallic catalyst having a low volumetric shrinkage rate can be used in virtually all hydroprocessing processes to treat a plurality of feeds under wide-ranging reaction conditions such as temperatures of from 200 to 450° C., hydrogen pressures of from 15 to 300 bar, liquid hourly space velocities of from 0.05 to 10 h$^{-1}$ and hydrogen treat gas rates of from 35.6 to 2670 m$^3$/m$^3$ (200 to 15000 SCF/B— or "Standard Cubic Feet per Barrel" of hydrocarbon compound feed to the reactor). The catalyst is also characterized by excellent catalytic activity, as giving an almost full HDN conversion rate (>99.99%) in the hydrotreating of heavy oil feedstock such as VGO.

EXAMPLES

The following illustrative examples are intended to be non-limiting.

Example 1

Ni—Mo—W-Maleate Catalyst Precursor

A catalyst precursor of the formula (NH$_4$) {[Ni$_{2.6}$(OH)$_{2.08}$ (C$_4$H$_2$O$_4^{2-}$)$_{0.06}$](Mo$_{0.35}$W$_{0.65}$O$_4$)$_2$} was prepared as follows: 52.96 g of ammonium heptamolybdate (NH$_4$)$_6$Mo$_7$O$_{24}$.4H$_2$O was dissolved in 2.4 L of deionized water at room temperature. The pH of the resulting solution was within the range of 2-3. 52.96 g of ammonium heptamolybdate (NH$_4$)$_6$Mo$_7$O$_{24}$.4H$_2$O was dissolved in the above solution. The pH of the resulting solution was within the range of 5-6. 73.98 g of ammonium metatungstate powder was then added to the above solution and stirred at room temperature until completely dissolved. 90 ml of concentrated (NH$_4$)OH was added to the solution with constant stirring. The resulting molybdate/tungstate solution was stirred for 10 minutes and the pH monitored. The solution had a pH in the range of 9-10. A second solution was prepared containing 174.65 g of Ni(NO$_3$)$_2$.6H$_2$O dissolved in 150 ml of deionized water and heated to 90° C. The hot nickel solution was then slowly added over 1 hr to the molybdate/tungstate solution. The resulting mixture was heated to 91° C. and stirring continued for 30 minutes. The pH of the solution was in the range of 5-6. A blue-green precipitate formed and the precipitate was collected by filtration. The precipitate was dispersed into a solution of 10.54 g of maleic acid dissolved in 1.8 L of DI water and heated to 70° C. The resulting slurry was stirred for 30 min. at 70° C., filtered, and the collected precipitate vacuum dried at room temperature overnight. The material was then further dried at 120° C. for 12 hr. The resulting material has a typical XRD pattern with a broad peak at 2.5 Å, denoting an amorphous Ni—OH containing material. The BET Surface area of the resulting material was 101 m$^2$/g, the average pore volume was around 0.12-0.14 cc/g, and the average pore size was around 5 nm.

Example 2

Ni—Mo—W Catalyst Precursor

A catalyst precursor of the formula (NH$_4$) {[Ni$_{2.6}$(OH)$_{2.08}$] (Mo$_{0.35}$W$_{0.65}$O$_4$)$_2$} was prepared as follows: 52.96 g of ammonium heptamolybdate (NH$_4$)$_6$Mo$_7$O$_{24}$.4H$_2$O was dissolved in 2.4 L of deionized water at room temperature. The pH of the resulting solution was within the range of 5-6. 73.98 g of ammonium metatungstate powder was then added to the above solution and stirred at room temperature until completely dissolved. 90 ml of concentrated (NH$_4$)OH was added to the solution with constant stirring. The resulting molybdate/tungstate solution was stirred for 10 minutes and the pH monitored. The solution had a pH in the range of 9-10. A second solution was prepared containing 174.65 g of Ni(NO$_3$)$_2$.6H$_2$O dissolved in 150 ml of deionized water and heated to 90° C. The hot nickel solution was then slowly added over 1 hr to the molybdate/tungstate solution. The resulting mixture was heated to 91° C. and stirring continued for 30 minutes. The pH of the solution was in the range of 5-6. A blue-green precipitate formed and the precipitate was collected by filtration. The precipitate was dispersed into a solution of 10.54 g of maleic acid dissolved in 1.8 L of DI water and heated to 70° C. The resulting slurry was stirred for 30 min. at 70° C., filtered, and the collected precipitate vacuum dried at room temperature overnight. The material was then further dried at 120° C. for 12 hr. The resulting material has a typical XRD pattern with a broad peak at 2.5 Å, denoting an amorphous Ni—OH containing material. The BET Surface area of the resulting material was 101 m$^2$/g, the average pore volume was around 0.12-0.14 cc/g, and the average pore size was around 5 nm.

Example 3

Extrusion Process

In this example, 40 g of dried catalyst precursor prepared as per examples 1-2 was mixed with 0.8 g of methocel, (a commercially available methylcellulose and hydroxypropyl methylcellulose polymer from Dow Chemical Company), and approximately 7 g of DI water was added. Another 7 g of water was slowly added until the mixture was of an extrudable consistency.

The mixture was extruded using any of a double barrel Wolf extruder with a 27½" screw and full-length of 33½" and with 1/16" die. The extrudate was cut into pellets with length of about ⅛" to ½".

Example 4

Drying Process

The catalyst precursor pellets (Ni—Mo—W and Ni—Mo—W-malleate) were dried under N$_2$ at 120° C. prior to sulfiding.

Example 5

Sulfidation with DMDS Gas Phase

The two samples of shaped catalyst precursors from Example 4 were placed in a tubular reactor. The temperature was raised to 450° F. at a rate of 100° F./hr under N$_{2(g)}$ at 8 ft$^3$/hr. The reaction was continued for 1 hour after which time the N$_2$ was switched off and replaced with H$_2$ at 8 ft$^3$/hr and 100 psig for 1 hour. The H$_2$ pressure was then increased to 300 psig and maintained for less than 1 hr. after which time dimethyl disulfide (DMDS) was added at a rate of 4 cc/hour and then reaction allowed to proceed for 4 hr. The catalyst precursor was then heated to 600° F. and the rate of DMDS addition increased to 8 cc/hr. The temperature was maintained at 600° F. for 2 hours after which time sulfidation was complete.

Measurements were taken from 30 catalyst precursor samples of both batches, catalyst precursors prepared from Ni—Mo—W and Ni—Mo—W-maleate precursors, before and after sulfidation. The results are illustrated as follows

| Catalyst precursor type | Ni—Mo—W precursor | Ni—Mo—W—maleate precursor |
|---|---|---|
| Diameter BEFORE sulfidation | 0.0583" | 0.0594" |
| Diameter AFTER sulfidation | 0.0556" | 0.05402" |
| % shrinkage | 4.68% | 9.11% |

Example 6

Hydroprocessing Process

The samples from Example 5 were tested under severe hydroprocessing conditions and activities with respect to hydrocracking, HDS, and HDN activity were evaluated, along with the volumetric shrinkage rate. The heavy oil feedstock was a vacuum gas oil (VGO) feedstock with a boiling point above 700° F., a sulfur content of 31135 ppm, a nitrogen content of 31230 ppm, and other properties as presented in Table 1. The reactor conditions include a pressure of 2300 psi, an H$_2$ gas rate of 5000 SCFB, and an LHSV of 0.75.

TABLE 1

| Properties | VGO Feedstock |
|---|---|
| API Gravity | 20.0 |
| N, ppm | 1100 |
| S, wt % | 2.72 |
| Carbon, wt % | 85.6 |
| 22 compounds | |
| Aromatics, vol % | 35.0 |
| Naphthenes, vol % | 27.8 |
| Paraffins, vol % | 13.5 |
| Sulfur compounds, vol % | 23.7 |
| Simdist, wt % | |
| 0.5/5 | 640/689 |
| 10/30 | 717/800 |
| 50/ | 866 |
| 70/90 | 930/1013 |
| 95/99 | 163/1168 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A bulk multi-metallic catalyst for use in the hydroconversion of hydrocarbon feedstock is formed by sulfiding a hydroxide catalyst precursor comprising:
   at least a Group VIB metal compound;
   at least a promoter metal compound selected from Group VIII, Group IIB, Group IIA, Group IVA and combinations thereof;
   optionally at least a ligating agent;
   optionally at least a diluent;
   wherein the hydroxide catalyst precursor has a residual geometric volume shrinkage of less than 12% upon sulfiding at a temperature of at least 100° C. for at least 30 minutes, and wherein the hydroxide catalyst precursor is formed in a process wherein the steps before sulfiding are carried out at a temperature of 200° C. or less for the catalyst precursor to remain a hydroxide before sulfiding.

2. The catalyst of claim 1, wherein the catalyst precursor has a residual geometric volume shrinkage of less than 12% upon sulfiding at temperature of at least 200° C. for at least 30 minutes.

3. The catalyst of claim 2, wherein the catalyst precursor has a residual geometric volume shrinkage of less than 10% upon sulfiding at temperature of at least 200° C. for at least 30 minutes.

4. The catalyst of claim 1, wherein the catalyst precursor has a residual geometric volume shrinkage of less than 10% upon sulfiding at temperature of at least 100° C. for at least 30 minutes.

5. The catalyst of claim 4, wherein the catalyst precursor has a residual geometric volume shrinkage of less than 8% upon sulfiding at temperature of at least 100° C. for at least 30 minutes.

6. The catalyst of claim 5, wherein the catalyst precursor has a residual geometric volume shrinkage of less than 5% upon sulfiding at a temperature of at least 100° C. for at least 30 minutes.

7. The catalyst of claim 6, wherein the catalyst precursor is of the formula $(X)_b(Mo)_c(W)_dO_z$; wherein X is Ni or Co, the molar ratio of b:(c+d) is 0.5/1 to 3/1, the molar ratio of c:d is >0.01/1, and z=[2b+6 (c+d)]/2.

8. The catalyst of claim 1, wherein the at least a diluent is selected from the group of titania, sodium silicate, potassium silicate, silica gels, silica sols, silica gels, hydronium- or ammonium-stabilized silica sols, sodium aluminate, potassium aluminate, aluminum sulfate, aluminum nitrate, magnesium aluminosilicate clay, magnesium metal, magnesium hydroxide, magnesium halides, magnesium sulfate, magnesium nitrate, zirconia, cationic clay, anionic clays, zinc oxide, zinc sulfide, tetraethyl orthosilicate, silicic acid, niobia, titania, and combinations thereof.

9. The catalyst of claim 1, wherein the at least a ligating agent is selected from carboxylates, carboxylic acids, aldehydes, ketones, aldehydes, hemiacetals, formic acid, acetic acid, propionic acid, maleic acid, malic acid, cluconic acid, fumaric acid, succinic acid, tartaric acid, citric acid, oxalic acid, glyoxylic acid, aspartic acid, alkane sulfonic acids, aryl sulfonic acids, maleate, formate, acetate, propionate, butyrate, pentanoate, hexanoate, dicarboxylate, and combinations thereof.

10. The catalyst of claim 1, wherein the at least a ligating agent is maleate.

11. The catalyst of claim 1, wherein the catalyst precursor is of the formula $A_v[(M^P)(OH)_x(L)^n{}_y]_z(M^{VIB}O_4)$, wherein A is at least one of an alkali metal cation, an ammonium, an organic ammonium and a phosphonium cation; $M^P$ is the at least a promoter metal compound, P is oxidation state with $M^P$ having an oxidation state of +2 or +4; and $M^P$ is selected elected from Group VIII, Group IIB, Group IIA, Group IVA and combinations thereof; L is at the least a ligating agent, $M^{VIB}$ is the at least a Group VIB metal, having an oxidation state of +6; $M^P:M^{VIB}$ has an atomic ratio of 100:1 to 1:100; $0<y\leq-P/n$; $0<x\leq P$; $0<v\leq 2$; $0<z$.

12. The catalyst of claim 11, where wherein $M^P$ is at least a Group VIII metal, $M^{VIB}$ is selected from molybdenum, tungsten, and combinations thereof, L is at least one of carboxylates, enolates, and combinations thereof.

13. The catalyst of claim 6, wherein the catalyst precursor has a surface area in the range of about 40 to 300 m²/g; a compact bulk density (CBD) of at most 1.6 g/cc; a pore volume of 0.002 to 2.0 cm³/g; a crush strength of at least about 5 lbs; and an attrition loss of less than 7 wt. %.

* * * * *